(12) United States Patent
Silberberg et al.

(10) Patent No.: US 7,698,000 B2
(45) Date of Patent: Apr. 13, 2010

(54) MICROSCOPE SYSTEM AND METHOD (75) Inventors: Yaron Silberberg, Lehavim (IL); Dan Oron, Rehovot (IL)

(73) Assignee: Yeda Research & Development Co., Ltd, Rehovot (IL)

( * ) Notice: Subject to any disclaimer, the term of this patent is extended or adjusted under 35 U.S.C. 154(b) by 375 days.

(21) Appl. No.: 11/662,765

(22) PCT Filed: Sep. 14, 2005

(86) PCT No.: PCT/IL2005/000976

§ 371 (c)(1),
(2), (4) Date: Mar. 14, 2007

(87) PCT Pub. No.: WO2006/030430

PCT Pub. Date: Mar. 23, 2006

(65) Prior Publication Data

US 2008/0130093 A1     Jun. 5, 2008

Related U.S. Application Data

(60) Provisional application No. 60/609,266, filed on Sep. 14, 2004.

(51) Int. Cl.
*G06F 19/00* (2006.01)
(52) U.S. Cl. .............................. 700/1; 356/73
(58) Field of Classification Search .................. 700/90, 700/1; 356/10; 359/883
See application file for complete search history.

(56) References Cited

U.S. PATENT DOCUMENTS

| | | | |
|---|---|---|---|
| 3,013,467 A | 12/1961 | Minsky | |
| 5,828,459 A | 10/1998 | Silberberg | |
| 6,020,591 A | 2/2000 | Harter et al. | |
| 6,188,514 B1 | 2/2001 | Saito et al. | |
| 6,429,667 B1 * | 8/2002 | Ausschnitt et al. | 324/699 |
| 6,462,345 B1 | 10/2002 | Simon et al. | |
| 7,436,501 B2 * | 10/2008 | Hashimoto et al. | 356/73 |
| 2002/0133065 A1 * | 9/2002 | Lucassen et al. | 600/322 |
| 2003/0030897 A1 * | 2/2003 | Suzuki | 359/385 |

OTHER PUBLICATIONS

Tal et al., Improved depth resolustion in video-rate line-scanning multiphoton microscopy using temporal focusing, Jul. 7, 2005, Optical Letter, vol. 30, No. 13, p. 1689-1688.*

(Continued)

*Primary Examiner*—Kidest Bahta
(74) *Attorney, Agent, or Firm*—Browdy and Neimark, PLLC (57) ABSTRACT

An optical system and method are presented for use in a multi-photon microscope. The system comprises an imaging lens arrangement, and a pulse manipulator arrangement. The pulse manipulator arrangement comprises a temporal pulse manipulator unit which is accommodated in an optical path of an input pulse of an initial profile, and is configured to affect trajectories of light components of the input pulse impinging thereon so as to direct the light components towards an optical axis of the lens arrangement along different optical paths, said temporal light manipulator unit being accommodated in a front focal plane of the imaging lens arrangement, thereby enabling to restore the input pulse profile at an imaging plane.

28 Claims, 4 Drawing Sheets

OTHER PUBLICATIONS

Azana et al., Spectro Temparal Imageing of Optical Pules With a Signal Time Lens, Mar. 3, 2004, IEEE photoonics Technology Letter vol. 16, No. 3, p. 882-884.*

W. Denk et al., "Two-Photon Laser Scanning Fluorescence Microscopy", Science, New Series, Apr. 1990, vol. 248, No. 4951, pp. 73-76.

C.J.R. Sheppard et al., "Confocal microscopes with slit apertures", J. Mod. Optics, 1988, vol. 35, No. 7, pp. 1169-1185.

G.J. Brakenhoff et al., "Real-time two-photon confocal microscopy using a femtosecond, amplified Ti:sapphire system", J. Microscopy, 1995, vol. 181, pp. 253-259.

M. Egger et al., "New Reflected-Light Microscope for Viewing Unstained Brain and Ganglion Cells", Science, New Series, Jul. 1967, vol. 157, No. 3786, pp. 305-307.

A.H. Buist et al., "Real time two-photon absorption microscopy using multipoint excitation", J. Microscopy, 1998, vol. 192, pp. 217-226.

J. Bewersdorf et al., "Multifocal multiphoton microscopy", Optics Letters, May 1998, vol. 23, No. 9, pp. 655-657.

G.J. Tearney et al., "Spectrally encoded confocal microscopy", Optics Letters, Aug. 1998, vol. 23, No. 15, pp. 1152-1154.

M. Kobayashi et al., "Second-harmonic-generation microscope with a microlens array scanner", Optics Letters, Aug. 2002, vol. 27, No. 15, pp. 1324-1326.

O.E. Martinez, "3000 Times Grating Compressor with Positive Group Velocity Dispersion: Application to Fiber Compensation in 1.3-1.6 um Region", IEEE J. Quantam Electronics, Jan. 1987, vol. QE-23, No. 1, pp. 59-64.

L. Sacconi et al., "Multiphoton multifocal microscopy exploiting a diffractive optical element", Optics Letters, Oct. 2003, vol. 28, No. 20, pp. 1918-1920.

A. Hopt et al., "Highly Nonlinear Photodamage in Two-Photon Fluorescence Microscopy", Biophysical J., Apr. 2001, vol. 80, pp. 2029-2036.

S.H. Cho et al., "Low-repetition-rate high-peak-power Kerr-lens mode-locked Ti:Al2O3 laser with a multiple-pass cavity", Optics Letters, Mar. 1999, vol. 24, No. 6, pp. 417-419.

T.B. Norris, "Femtosecond pulse amplification at 250 kHz with a Ti:sapphire regenerative amplifier and application to continuum generation", Optics Letters, Jul. 1992, vol. 17, No. 14, pp. 1009-1011.

M.G.L. Gustaffson, "Surpassing the lateral resolution limit by a factor of two using structured illumination microscopy", J. Microscopy, Jan. 2000, vol. 198, Pt. 2, pp. 82-87.

G. Peleg et al., "Gigantic optical non-linearities from nanoparticle-enhanced molecular probes with potential for selectively imaging the structure and physiology of nanometric regions in cellular systems", Bioimaging 4, 1996, pp. 215-224.

Y. Barad at al., "Nonlinear scanning laser microscopy by third harmonic generation", Appl. Phys. Letter, Feb. 1997, vol. 70, pp. 922-924.

M. Muller et al., "3D microscopy of transparent objects using third-harmonic generation", J. Microscopy, Sep. 1998, vol. 191, Pt. 3, pp. 266-274.

M.D. Duncan et al., "Scanning coherent anti-Stokes Raman microscope", Optics Letters, Aug. 1982, vol. 7, No. 8, pp. 350-352.

A. Zumbusch et al., "Three-Dimensional Vibrational imaging by Coherent Anti-Stokes Raman Scattering", Physical Review Letter, May 1999, vol. 82, No. 20, pp. 4142-4145.

E.N. Glezer et al., "Three-dimensional optical storage inside transparent materials", Optics Letters, Dec. 1996, vol. 21, No. 24, pp. 2023-2025.

W. Zipfel et al., "Nonlinear magic: multiphoton microscopy in the biosciences", Nature Biotechnology, Nov. 2003, vol. 21, No. 11, pp. 1369-1377.

G.Y. Fan et al., "Video-Rate Scanning Two-Photon Excitation Fluorescence Microscopy and Ratio Imaging with Cameleons", Biophysical J., May 1999, vol. 76, pp. 2412-2420.

S.W. Hell et al., "Space-mulitplexed multifocal nonlinear microscopy", J. Microscopy, Jun. 2001, vol. 202, Pt. 3, pp. 457-463.

* cited by examiner

MICROSCOPE SYSTEM AND METHOD

FIELD OF THE INVENTION

This invention is generally in the field of optical techniques, and relates to a multi-photon method and system for use in microscopy, or in material processing techniques.

BACKGROUND OF THE INVENTION

Laser-scanning microscopy, confocal or multiphoton based microscopy, provides for performing optical sectioning.

The confocal microscope, disclosed in U.S. Pat. No. 3,013,467, utilizes optical sectioning of microscopic samples, i.e. the rejection of out-of-focus scattering, by using a confocal pinhole in front of the detection system.

The field of confocal microscopy relies on the idea of point-by-point illumination of a sample and using mechanical scanning (i.e. displacing the light beam and/or the sample) in order to collect an image. The imaging is thus a time consuming process, which is typically limited to a few tens of milliseconds per section in current commercial systems, a limit set by the speed of mechanical scanning devices. This is an inherent limitation of the confocal method, which significantly limits its utility for fast time-resolved imaging.

Multiphoton microscopes offer a different mechanism for optical sectioning. Here, a need for rejecting out-of-focus scattering is practically eliminated due to the nonlinear dependence of the measured signal on the illumination intensity. A multiphoton process, most commonly two-photon excitation fluorescence (TPEF), is efficient only when the peak intensity of the illuminating light is high, i.e. at the focal spot [Denk, W., Strickler, J. H., Webb, W. W., Two-photon laser scanning fluorescence microscopy, *Science* 248, 73-76 (1990)]. Due to the high energy densities required for inducing nonlinear processes, multiphoton microscopes require the use of a short pulsed laser. However, acquisition of an image still requires scanning of either the sample or the laser beam, resulting in a similar restriction of the image frame rate.

Numerous methods have been developed to increase the image acquisition rate in both confocal and multiphoton microscopes. Most of these methods involve multi-point illumination and scanning in a single spatial axis. Common examples are single-axis scanning and the use of line illumination [Sheppard, C. J. R., Mao, X. Q., Confocal microscopes with slit apertures, *J. Mod. Optics* 35, 1169-1185 (1988); Brakenhoff, G. J., Squier, J., Norris, T., Bliton, A. C., Wade, M. H., Athey, B., Real-time two-photon confocal microscopy using a femtosecond, amplified, Ti:Sapphire system, *J. Microscopy* 181, 253-259 (1995)]; and rotation of a patterned disk (in confocal microscopy) [Egger, M. D., Petran, New reflected-light microscope for viewing unstained brain and ganglion cells, *Science* 157, 305-307 (1967)] or a lenslet array (in multiphoton microscopy) [Buist, A. H., Muller, M., Squier, J., Brakenhoff, G. J., Real-time two-photon absorption microscopy using multipoint excitation, *J. Microscopy* 192, 217-226 (1998); Bewersdorf, J., Pick, R., Hell, S. W., Multifocal multiphoton microscopy, *Opt. Lett.* 23, 655-657 (1998)]. Others have used chromatic multiplexing [Tearney, G. J., Webb, R. H., Bouma, B. E., Spectrally encoded confocal microscopy, *Opt. Lett.* 23, 1152-1154 (1998)]. Overall, however, frame rates have not been reduced significantly beyond video-rate imaging.

The use of a rotatable microlens array in a microscope is also disclosed in Minoru Kobayasky et al. "Second-harmonic-generation microscope with a microlens array scanner", Optics letters, Vol. 27, No. 15, Aug. 1, 2002. According to this technique, the microlens array is located in the optical path of a collimated input laser beam, and splits the laser beam into a plurality of beamlets, which are collimated again and are incident upon a water-immersion objective lens. This way, a multiple number of foci illuminating a specimen are used. Each focus spot is timely separated from adjacent spots, preventing interference between neighboring focal fields from causing degradation in 3D resolution. By rotation of the microlens array disk, each focal spot on the specimen is scanned simultaneously.

Yet another technique, disclosed in L. Saconi et al., "Multiphoton multifocal microscopy exploiting a diffractive optical element", Optics letters, Vol. 28, No. 20, Oct. 15, 2003, utilizes a miniature diffractive optical element in tandem with galvo scanners to produce neat multispot grids with high diffraction efficiency and provides a high degree of uniformity in focal intensity. Here, several telescopic lens pairs are used for pivoting the grid on galvo scanners.

U.S. Pat. No. 6,020,591 discloses a two-photon fluorescence microscope with plane wave illumination. This technique is aimed at eliminating the need for moving parts to effect lateral scanning of the laser beam as well as creation of a three-dimensional image, in a two-photon fluorescence microscope. This microscope employs two laser beams having pulses of respective wavelengths $\lambda_2$ and $\lambda_3$, which cause two-photon emission of a fluorophore when the pulses are spatially and temporally overlapping. The pulses of the two beams of wavelengths $\lambda_2$ and $\lambda_3$ are combined at some crossing angle $\theta$ within the specimen, causing two-photon absorption within a line-shaped region during each instant of overlap. As the pulses pass through each other, the overlapping line-shaped region moves such that a slice of the fluorophore-containing specimen is excited by two-photon absorption during the overlap period. Lateral scanning is effected without moving parts by adjusting the relative delay of the pulses in the two beams. When the crossing angle $\theta$ is set to 0, i.e. when the two beams are directed along the same axis, the pulses of the two beams form a pancake-shaped volume in which two-photon excitation occurs as the pulses spatially and temporally overlap while traveling in opposite directions. A two-dimensional detector, such as a two-dimensional charge coupled device (CCD) array, can be used to detect a two-dimensional portion of the specimen at one time without lateral scanning. A three-dimensional image can be produced by adjusting the time delay between the two pulses, thereby changing the location of the "pancake" volume created by the intersection of the two pulses.

The conventionally used laser-scanning microscopy, be it confocal or multiphoton microscopy, although being capable of performing optical sectioning, requires a long image acquisition time, of an order of tens of milliseconds, due to the scanning process [Wilson, T., Confocal Microscopy, Academic press, London (1990)].

SUMMARY OF THE INVENTION

There is a need in the art to facilitate multiphoton microscopy imaging of a sample by providing a novel illumination configuration and method of its operation.

It should be understood that the illuminating technique of the present invention, as well as the imaging method utilizing the same, can be readily applied also to measuring, inspection and material processing techniques, where the term "material processing" refers to a process inducing a change in the optical properties (e.g. refraction index) of a material.

The main idea of the present invention is aimed at eliminating or at least significantly reducing mechanical scanning (i.e. relative displacement between a sample and an illuminating light beam) across the sample (i.e. in the focal plane of the microscope). The present invention provides for illuminating a region on the sample of dimensions many orders of magnitude larger than a diffraction-limited spot of the imaging lens arrangement used in the microscope. This is achieved by manipulating an input light pulse to apply spatiotemporal pulse shaping, and thus obtain full-frame depth resolved imaging without scanning.

As indicated above, in multiphoton laser scanning microscopes the depth resolution is achieved by spatially focusing an ultrashort pulse to achieve a high intensity at the focal plane. Due to the nonlinear dependence of the signal on the intensity, this results in superb rejection of the out-of-focus signal.

In contrast, the technique of the present invention relies on temporal focusing of the illumination pulse, possibly combined with spatial focusing, along one spatial axis. This temporal focusing is based on the pulsed excitation field being compressed as it propagates through the sample, reaching its shortest duration (and highest peak intensity) at the focal plane, before stretching again beyond it.

According to the present invention, fall-frame depth-resolved microscopy can be achieved using an extremely simple setup and standard components. An optical system of the present invention utilizes a pulse manipulator arrangement including a temporal pulse manipulator configured to define a surface, which extends perpendicular to the optical axis of a microscope in the front focal plane of an imaging lens arrangement, and which is patterned to affect trajectories of light components of the input short pulse impinging onto different points of this surface to direct these light components along different optical paths. This is implemented using a scattering surface or a thin scattering plate. Preferably, the pattern is such as to provide a directional scattering, towards the optical axis.

Due to the input pulse interaction with the scattering surface, the pulse duration at any point of the light path between the scattering surface and the lens arrangement is longer than that of the initial input pulse, because of the difference in the lengths of trajectories taken by the light rays reaching this point from the scattering surface. Only at the image plane the pulse duration is restored to its initial value (in accordance with the Fermat principle). Thus, the use of the scattering surface produces a weakly focused exciting beam, exciting the full frame of interest in the sample, i.e., an area which is many orders of magnitude larger than a diffraction-limited spot of the lens arrangement.

Preferably, in order to further increase the difference in the optical paths length, the optical system is configured so as to provide the input beam incidence onto the scattering surface with a certain non-zero angle of incidence (tilt geometry). In this case, the focal plane is illuminated by means of a moving illuminated line.

As indicated above, the technique of the present invention may utilize both the temporal focusing of the illumination pulse and spatial focusing of this pulse along one axis (Y-axis). In this case, considering the scattering surface extends along the Y-axis and provides the temporal focusing, the spatial focusing along the Y-axis is obtained by displacing (scanning) an input pulse along the scattering surface while directing the beam onto this surface through an anamorphic lens arrangement (e.g., cylindrical lens) producing a line image. This results in line illumination in the sample, but with a depth resolution similar to that achievable by fast scanning methods (e.g. microlens arrays).

Thus, according to one broad aspect of the present invention, there is provided an optical system for use in a multi-photon microscope or optical processing of a sample, the optical system comprising an imaging lens arrangement, and a pulse manipulator arrangement, the pulse manipulator arrangement comprising a temporal pulse manipulator unit which is accommodated in an optical path of an input pulse of an initial profile, and is configured to affect trajectories of light components of the input pulse impinging thereon so as to direct the light components towards the optical axis of the lens arrangement along different optical paths, said temporal light manipulator unit being accommodated in a front focal plane of the imaging lens arrangement, thereby enabling to restore the input pulse profile at an imaging plane.

According to another broad aspect of the invention, there is provided an optical system for use in a multi-photon microscope, the optical system comprising an imaging lens arrangement, and a light scattering surface, which is accommodated in an optical path of a single pulse of a certain initial profile thus affecting a duration of the input pulse at a point downstream of said surface, and which is aligned perpendicular to an optical axis of the imaging lens arrangement in a front focal plane thereof, thereby producing, in an imaging plane, an illuminating pulse of said initial profile illuminating a region which is many orders of magnitude larger than a diffraction-limited spot of the imaging lens arrangement.

According to yet another broad aspect of the invention, there is provided an optical system for use in a multi-photon illumination of a sample, the optical system comprising an imaging lens arrangement, and a light scattering surface accommodated in a front focal plane of the lens arrangement perpendicular to an optical axis of the lens arrangement, said light scattering surface thereby operating as a temporal pulse manipulator providing temporal focusing of the input pulse.

According to yet another broad aspect of the invention, there is provided an optical system for use in a multi-photon illumination of a sample, the optical system comprising an imaging lens arrangement, and a pulse manipulator arrangement, said pulse manipulator arrangement comprising: a temporal pulse manipulator accommodated in a front focal plane of the lens arrangement and extending along a first axis perpendicular to an optical axis of the lens arrangement, the temporal pulse manipulator being operable to provide temporal focusing of an input pulse; and a spatial pulse manipulator which is accommodated in an optical path of an input pulse propagating towards the temporal pulse manipulator and is configured for focusing the input pulse in the form of a line extending along said first axis.

There is also provided a multi-photon microscope comprising a light source assembly operable to generate a short pulse of a predetermined initial profile; a light detection assembly; and an optical system, the optical system comprising an imaging lens arrangement, and a light scattering surface accommodated in a front focal plane of the lens arrangement perpendicular to an optical axis of the lens arrangement, said light scattering surface thereby operating as a temporal pulse manipulator providing temporal focusing of the input pulse.

According to yet another aspect of the invention, there is provided a multi-photon microscope comprising a light source assembly operable to generate a short pulse of a predetermined initial profile; a light detection assembly; and an optical system comprising an imaging lens arrangement and a pulse manipulator arrangement, said pulse manipulator arrangement comprising a temporal pulse manipulator being aligned perpendicular to an optical axis of the imaging lens arrangement in a front focal plane of the imaging lens arrangement, the temporal pulse manipulator being configured to affect trajectories of light components of the input pulse to increase the pulse duration at a point downstream of the temporal pulse manipulator, thereby producing, in an imaging plane, an illuminating pulse that has a restored profile of the initial pulse and has a cross-sectional area significantly larger than a diffraction-limited spot of the imaging lens arrangement.

According to yet another aspect of the invention, there is provided a multi-photon microscope comprising a light source assembly operable to generate a short pulse of a predetermined initial profile; a light detection assembly; and an optical system comprising an imaging lens arrangement and a pulse manipulator arrangement, the pulse manipulator arrangement comprising a temporal pulse manipulator unit, the temporal pulse manipulator unit being aligned perpendicular to an optical axis of the imaging lens arrangement in a front focal plane of the imaging lens arrangement and oriented with respect to the initial input pulse such that said initial impulse pulse is incident onto said temporal pulse manipulator unit with a certain non-zero angle of incidence, the temporal pulse manipulator unit being configured to affect trajectories of light components of the input pulse to thereby affect a duration of the pulse at a point downstream of said temporal pulse manipulator, thereby producing, in an imaging plane, an illuminating pulse that has a restored profile of the initial pulse and moves along the imaging plane thereby illuminating an area significantly larger than a diffraction-limited spot of the imaging lens arrangement.

The present invention also provides a multi-photon microscope comprising a light source assembly operable to generate a short pulse of a predetermined initial profile; a light detection assembly; and an optical system comprising an imaging lens arrangement, and a pulse manipulator arrangement, said pulse manipulator arrangement comprising: a temporal pulse manipulator accommodated in a front focal plane of the lens arrangement and extending along a first axis perpendicular to an optical axis of the lens arrangement, the temporal pulse manipulator being operable to provide temporal focusing of an input pulse; and a spatial pulse manipulator which is accommodated in an optical path of an input pulse propagating towards the temporal pulse manipulator and is configured for focusing the input pulse in the form of a line extending along said first axis.

According to yet another broad aspect of the invention, there is provided a multi-photon material processing system for inducing a change in optical properties of a material, the system comprising a light source assembly operable to generate a short pulse of a predetermined initial profile and predetermined intensity; and an optical system comprising an imaging lens arrangement, and a pulse manipulator arrangement, the pulse manipulator arrangement comprising a temporal pulse manipulator unit which is accommodated in an optical path of an input pulse of an initial profile, and is configured to affect trajectories of light components of the input pulse impinging thereon so as to direct the light components towards an optical axis of the lens arrangement along different optical paths, said temporal light manipulator unit being accommodated in a front focal plane of the imaging lens arrangement, thereby enabling to restore the input pulse profile at an imaging plane.

According to yet another broad aspect of the invention, there is provided a multi-photon material processing system for inducing a change in optical properties of a material, the system comprising a light source assembly operable to generate a short pulse of a predetermined initial profile and predetermined intensity; and an optical system comprising an imaging lens arrangement, and a light scattering surface accommodated in a front focal plane of the lens arrangement perpendicular to an optical axis of the lens arrangement, said light scattering surface thereby operating as a temporal pulse manipulator providing temporal focusing of the input pulse.

According to yet another broad aspect of the invention, there is provided a multi-photon material processing system for inducing a change in optical properties of a material, the system comprising a light source assembly operable to generate a short pulse of a predetermined initial profile and predetermined intensity; and an optical system comprising an imaging lens arrangement, and a pulse manipulator arrangement, said pulse manipulator arrangement comprising: a temporal pulse manipulator accommodated in a front focal plane of the lens arrangement and extending along a first axis perpendicular to an optical axis of the lens arrangement, the temporal pulse manipulator being operable to provide temporal focusing of an input pulse; and a spatial pulse manipulator which is accommodated in an optical path of an input pulse propagating towards the temporal pulse manipulator and is configured for focusing the input pulse in the form of a line extending along said first axis.

According to yet another broad aspect of the invention, there is provided a method for imaging a sample by a multi-photon microscope, the method comprising: directing a single input pulse of a predetermined initial duration onto a scattering surface accommodated in a front focal plane of an imaging lens arrangement and extending perpendicular to an optical axis of the imaging lens arrangement, thereby affecting a duration of the pulse at any point downstream of said surface with respect to the pulse propagation towards the sample, and allowing restoration of the initial pulse duration in an imaging plane, to thereby illuminate, by said single input pulse, in the imaging plane a region significantly larger than a diffraction-limited spot of the imaging lens arrangement.

In yet another aspect of the invention, there is provided a method for illuminating a sample by multi-photon radiation, the method comprising: directing a single input pulse of a predetermined initial duration onto a scattering surface with a certain non-zero angle of incidence, the scattering surface being accommodated in a front focal plane of an imaging lens arrangement perpendicular to an optical axis of the imaging lens arrangement, thereby effecting a temporal focusing of the input pulse on an imaging plane in a sample.

According to another broad aspect of the invention, there is provided a method for use in illuminating a sample by multi-photon radiation, the method comprising: generating an input pulse of a predetermined initial duration, scanning by the single input pulse, while being shaped as a line, a scattering surface that is accommodated in a front focal plane of an imaging lens arrangement and extends along a first axis perpendicular to an optical axis of the imaging lens arrangement, and allowing the pulse propagation through the imaging lens arrangement, thereby effecting a temporal focusing of the input pulse on an imaging plane in a sample and effecting a spatial focusing of the input pulse on the imaging plane along the first axis.

According to another broad aspect of the invention, there is provided a method for imaging a sample by a multi-photon microscope, the method comprising: directing a single input pulse of a predetermined initial duration onto a scattering surface accommodated in a front focal plane of an imaging lens arrangement and extending perpendicular to an optical axis of the imaging lens arrangement, thereby affecting a duration of the pulse at any point downstream of said surface, with respect to the pulse propagation towards the sample, and allowing restoration of the initial pulse duration in an imaging plane, to thereby illuminate in the imaging plane a region significantly larger than a diffraction-limited spot of the imaging lens arrangement.

According to another broad aspect of the invention, there is provided a method for imaging of a sample by a multi-photon microscope, the method comprising: directing a single short input pulse of a predetermined initial duration onto a scattering surface with a certain non-zero angle of incidence of the input pulse onto said surface, with said surface being accommodated in a front focal plane of an imaging lens arrangement and extending perpendicular to an optical axis of the imaging lens arrangement, thereby affecting a duration of the pulse at any point downstream of said surface, with respect to the pulse propagation towards the sample, and allowing restoration of the initial pulse duration in an imaging plane, to thereby provide traveling of an illumination spot along the imaging plane, thereby illuminating a region significantly larger than a diffraction-limited spot of the imaging lens arrangement.

According to another broad aspect of the invention, there is provided a method for use in a multi-photon material processing of a sample, the method comprising: generating an input pulse of a predetermined initial duration and predetermined intensity; directing the single input pulse onto a scattering surface accommodated in a front focal plane of an imaging lens arrangement and extending along a first axis perpendicular to an optical axis of the imaging lens arrangement, thereby effecting a temporal focusing of the input pulse on an imaging plane in a sample along an illuminating region on which the pulse is focused being many orders of magnitude larger than a diffraction-limited spot of the imaging lens arrangement.

More specifically the present invention is used in multi-photon microscopy and is therefore described below with respect to this specific application. However, it should be understood that the invention is not limited to imaging techniques in general and to microscopy in particular. The technique of the present invention can also be used for material processing, e.g. simultaneous depth-resolved modification of a transparent substrate by femtosecond radiation. This may be aimed at creating a pattern in a medium, for example forming a waveguide or a multiple-waveguide configuration.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

The present invention provides for depth-resolved imaging, e.g. multiphoton microscopy (e.g., TPEF microscopy), or material processing (e.g. patterning), performed without a need for scanning the radiation beam along a sample (i.e. without a need for a relative displacement between an exciting light beam and a sample along a focal plane). In other words, the present invention provides for imaging/processing a sample with a scanningless optical system (e.g. microscope). To this end, the technique of the present invention utilizes temporal focusing of a single input light pulse (rather than spatial focusing), and possibly also utilizes a spatial focusing along one spatial axis.

Figure 1A:
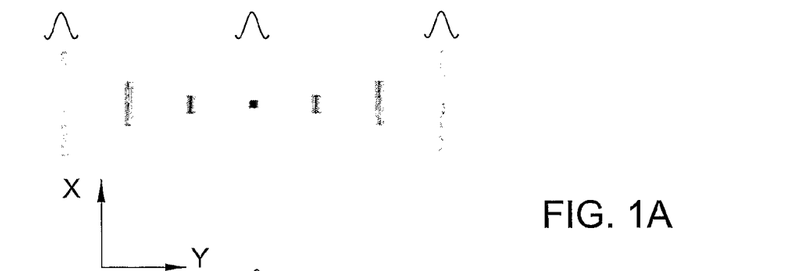
FIGS. 1A and 1B illustrate the principles of a scanningless depth resolved illumination technique of the present invention (FIG. 1B) as compared to those of the standard multiphoton microscopy (FIG. 1A)
Figure 1B:
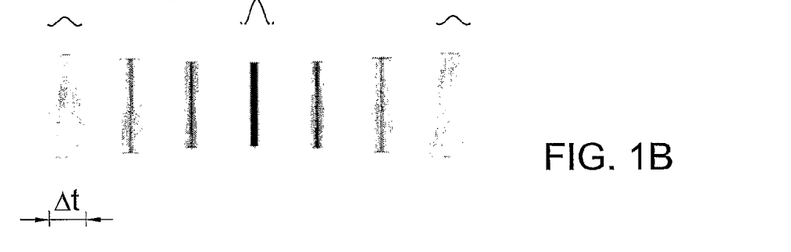

Referring to FIGS. 1A and 1B there are schematically illustrated the principles of such a scanningless depth resolved microscopy as compared to the standard multiphoton microscopy scheme. Here, the X-axis is the lateral axis extending along the sample (i.e. axis perpendicular to the optical axis of an objective lens arrangement of the microscope) and Z-axis is the axis through the sample (i.e. axis parallel to the optical axis of the microscope).

In the standard multiphoton scheme (FIG. 1A), an ultrashort pulse is spatially focused, generating high peak intensity at the focus of the objective lens arrangement. The temporal profile of the pulse (i.e. the pulse duration) remains nearly unchanged as it propagates through the sample, as the broadening due to material dispersion is negligible in microscopic samples.

In the invented scanningless scheme (FIG. 1B), an illuminating (exciting) beam is weakly focused, exciting the full frame of interest in the specimen, i.e. a region which is many orders of magnitude larger than a diffraction-limited spot of the objective. The depth resolution is achieved by controlling the temporal profile of the pulse, which is compressed as it propagates through the sample, reaching its peak intensity value at the focal plane, and stretching again as it propagates beyond it. The depth-resolved multiphoton signal can now be collected from the entire illuminated frame using an imaging setup.

Figure 2:
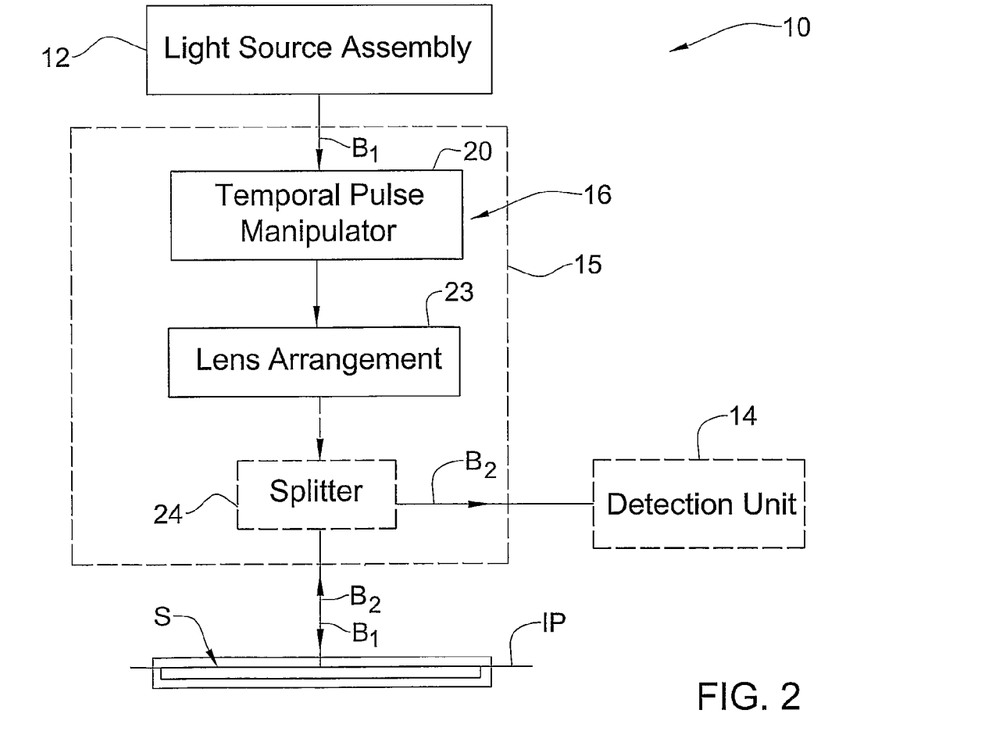
FIG. 2 schematically illustrates the configuration of a scanningless optical system according to the invention, that may be used in microscopy or material processing.

Thus, the technique of the present invention utilizes an optical system configured to enable the temporal manipulations of the exciting pulse profile. FIG. 2 schematically illustrates, by way of a block diagram, a scanningless optical apparatus (microscope) 10 configured and operated according to the invention. In the present example, the apparatus 10 is configured as an imaging system (TPEF microscope), but is should be understood that the principles of the invention are applicable to material processing (e.g. patterning) as well.

The microscope 10 includes such main constructional parts as a light source assembly 12; and an optical system 16 configured according to the invention; and in the present example of a microscope (generally, imaging) system configuration includes also a detection unit 14 (shown in the figure in dashed lines). The detection unit 14 may be configured to define an array of image pixels (e.g. CCD), may be configured for intensified or non-intensified light detection, as well as for gated or non-gated light detection.

It should be understood that the light source, as well as the detector, may or may not be accommodated in the same housing 15 enclosing the optical system 16. For example, the light source and/or detector may be accommodated outside the housing 15 and light may be guided towards and/or away from a sample S via light guiding means (either in free space or in optical fibers).

The optical system 16 includes a temporal pulse manipulator unit 20; a lens arrangement 23, and in the present example also includes a light separating assembly (dichroic beam splitter) 24 (shown in the figure in dashed lines) for spatially separating between illuminating (exciting) light $B_1$ and light response $B_2$ (excited light) coming from the sample. It should be noted that the beam splitter 24 is not necessarily accommodated downstream of the lens arrangement (as shown in the figure), but the configuration may be such that the lens arrangement is formed by multiple lenses and the beam splitter is located between the lenses, as will be exemplified further below. The lens arrangement 23 defines an optical axis of the optical system 16, and is configured as a focusing arrangement, and may also be configured to provide a desired image magnification. The lens arrangement 23 thus typically includes at least an objective lens assembly (formed by one or more lenses).

The temporal pulse manipulator 20 is accommodated in a front focal plane of the lens arrangement 23, and extends along an axis substantially perpendicular to the optical axis. The temporal pulse manipulator 20 is configured to affect the trajectories of light components of the input light impinging upon different points along the manipulator. To this end, the pulse manipulator 20 is configured to define a surface patterned to appropriately scatter the input light.

The light source assembly 12 is operable to generate a short pulse of light $B_1$. In this connection, the following should be noted. Generally, in order to optimize the nonlinear effect, short pulses are advantageous. However, too short pulses (pulse duration time less than 20 fs) should preferably be avoided, since they suffer from significant material dispersion and since their bandwidth may exceed the TPEF absorption linewidth. On the other hand, the use of too long pulses (pulse duration time larger than 100 fs) increases complexity since this requires large magnifications and grazing incidence scattering from the temporal light manipulator.

The short input pulse $B_1$ impinges onto the scatterer 20, which scatters the input light towards the imaging lens arrangement 23 along different trajectories (different optical paths) of light propagation. The imaging lens arrangement 23 images the scatterer 20 on an image plane IP located inside the sample S. Light response $B_2$ of the sample is directed onto the CCD 14 using the dichroic mirror 24.

Figure 3:
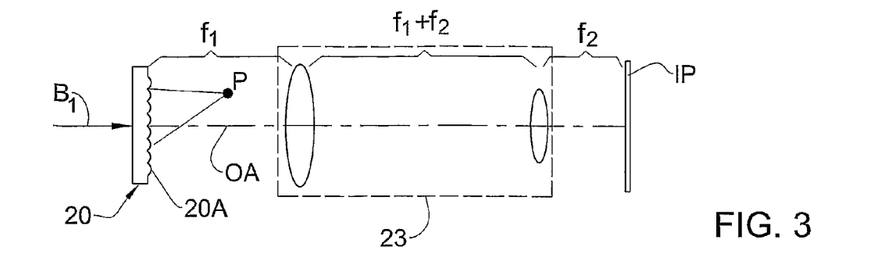
FIG. 3 schematically illustrates the effect of a temporal pulse manipulator used in the system of FIG. 2.

The effect of the scatterer 20 will now be described in more detail with reference to FIG. 3. Such a scatterer 20 may be a plate with the scattering surface 20A. The plate 20 may be either light reflective or light transmitting. Accordingly, the light source assembly 12 (or the light guiding assembly that may for example include mirrors) is appropriately oriented to direct input light $B_1$ onto the scattering surface 20A through the plate 20 in the case the plate is transmitting, or directly onto surface 20A in the case of a reflective plate (not shown here).

Preferably, the scatterer 20 is configured to provide a directional scattering towards the optical axis OA. For example, such a directional scatterer 20 may be in the form of a diffraction grating. It should be understood that the use of a grating has the advantage in that the grating can be designed to maximize the diffraction towards the optical axis OA. It is important to note that for the purposes of the present invention, such a diffraction grating is a single-order grating, rather than a multiple-order grating typically used for splitting the input beam into spatially separated light components.

A short input pulse $B_1$ impinges onto the scatterer 20. At a point P further away, the pulse duration is longer due to the difference in the lengths of trajectories taken by the light rays reaching point P from different locations on the scatterer. Only at the image plane IP (focal plane of the lens arrangement 23) is the pulse duration restored to its initial value, in accordance with the Fermat principle (or the principle of least time): the path of a ray, e.g. light, from one point to another (including refractions and reflections) will be that taking the least time. More specifically, a short pulse with duration τ illuminates the scattering plate 20, and each point of the plate scatters the light into many directions; each point in the image plane IP is also illuminated for duration τ, since all light rays emerging from a single point in the object travel identical optical path lengths and reach the image at the same time (according to the Fermat principle). However, any other point, at some distance either from the scattering plate 20 or from the image plane IP is illuminated for a longer duration, dictated by the different trajectories taken by the rays reaching this point. The larger the distance between the specific point and the scatterer, the longer the illumination time for this point. Hence, points outside the focal plane of the optical system (in front or in the back of the focal plane) undergo extended illumination. This is the required condition for temporal focusing. Obviously, the rate of pulse broadening is larger for lenses with higher numerical aperture, and accordingly such lenses have shorter depth of temporal focus.

Thus, the technique of the present invention utilizes an optical system configured to enable the temporal manipulations of the exciting pulse profile. To this end, the system merely uses a scattering surface (e.g. a thin scattering plate) accommodated at the front focal plane of the lens arrangement.

It should be noted that the input (exciting) beam does not have to illuminate the entire scattering surface simultaneously. Actually, it is advantageous to tilt the beam, i.e. provide the input beam incidence on the scattering surface with a certain non-zero angle of incidence. As a result, the illuminating pulse, typically extending only a few microns, scans across the scattering surface (and its image then scans across the sample plane). The tilted geometry introduces larger path length differences between rays arriving at any point, and thus has the effect of reducing the depth of temporal focus. This geometry is reminiscent of line scanning microscopy, only that the full frame is scanned in a few picoseconds by the traveling pulse itself. Considering diffraction effects, precise analysis yields that in an optimized system the depth of temporal focus becomes identical with the spatial one [Martinez, O. E., 3000 times grating compressor with positive group-velocity dispersion—application to fiber compensation in 1.3-1.6 μm region, *IEEE J. Quantum Electronics* 23, 59-64 (1987)]. Directing an input pulse onto the scattering surface with a certain non-zero angle of incidence results in that the focal plane of the objective lens arrangement (image plane) is illuminated by means of a moving illuminated line, which extends along the X-axis (considering the scattering surface extends along the Y-axis, and the optical axis OA is the Z-axis).

Figure 4A:
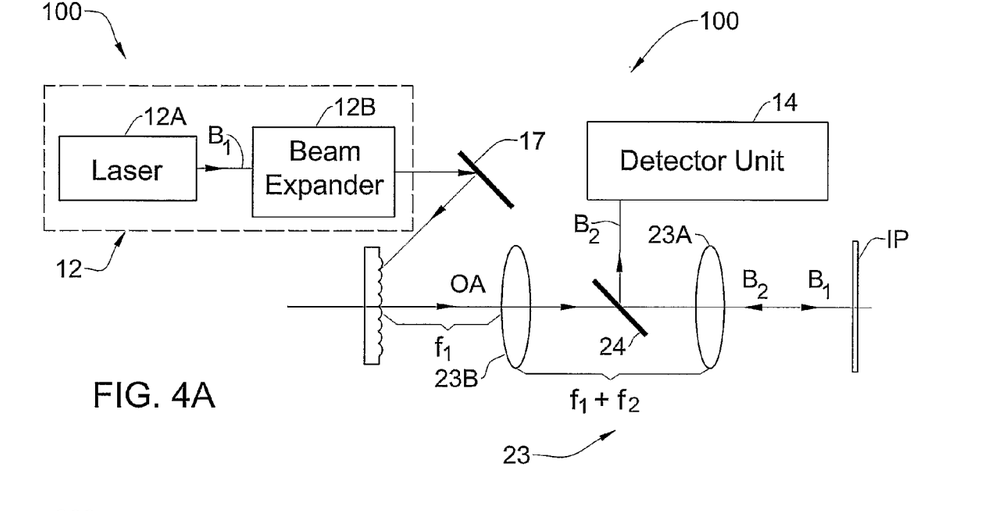
FIG. 4A shows an example of a scanningless TPEF microscope of the present invention.

Reference is now made to FIG. 4A showing schematically an experimental TPEF microscope setup 100 constructed and operated according to the invention. Here, a light source assembly 12 included a Ti:Sapphire laser oscillator 12A generating 10 fs pulses $B_1$ at a repetition rate of 75 MHz, and a beam expander 12B (an achromatic X3 telescope) operating to spatially expand the input pulse to a Gaussian shape with a diameter of about 1.2 cm. The so-expanded pulse was directed onto a reflective patterned surface 20A (scatterer) of 300 l/nm single-order grating 20, via a mirror 17, oriented so as to direct the light pulse $B_1$ onto the surface 20A at a certain non-zero angle of incidence such that the central wavelength of the pulse would be diffracted towards the optical axis OA of the microscope 100. The surface 20A is arranged perpendicular to the optical axis OA. An optical system 16 further includes a lens arrangement 23 and a dichroic beam splitter 24. The lens arrangement 23 is in the form of a high magnification telescope system including a 20 cm achromatic lens 23B and an X100 NA=1.4 fluar objective (Zeiss) 23A, corresponding to a magnification of about 125. The lenses 23A and 23B have focal length $f_2$ and $f_1$, respectively, and are spaced from each other at a distance $(f_1+f_2)$. The wavelength-selective beam splitter (dichroic mirror) 24 is accommodated between the lenses 23A and 23B. The scattering plate (grating) 20 is accommodated in a front focal plane of the lens 23B. It should be noted that the telescope setup used the objective as the second lens, so that fluorescence imaging can be performed in an epi-detected configuration. The field of view is determined both by the spot size on the grating and by the magnification of the telescope. This setup produced a field of view of about 100 μm in diameter in the object plane (sample plane). The total illumination energy per pulse was about 0.4 nJ, corresponding to an energy per pixel of the order of 0.01 pJ (this is about two orders of magnitude below a stringent assessment of the damage thresholds [Hopt, A., Neher, E., Highly nonlinear photodamage in two-photon fluorescence microscopy, *Biophys. J.* 80, 2029-2036 (2001)]). In this experimental setup, a Zeiss axiovert inverted microscope was used as an imaging platform. A detection unit 14 included a photomultiplier tube and a cooled intensified CCD (which are not specifically shown). Epi-detected fluorescence was either measured by the photomultiplier tube or imaged onto the CCD, via the dichroic mirror 24 and a filter (not shown) located in front of the detector for rejecting a spectral range of the exciting light.

A distance between the scattering surface 20A and the objective lens 23A was slightly increased from $(f_1+f_2)$ (a few millimeters shift for a 20 cm distance) in order to compensate for both the chromatic aberration of the objective and the material dispersion, so as to induce TPEF at the visible focal plane of the objective. This ensures maximal transverse resolution at a cost of a slight decrease in the depth resolution.

Figure 4B:
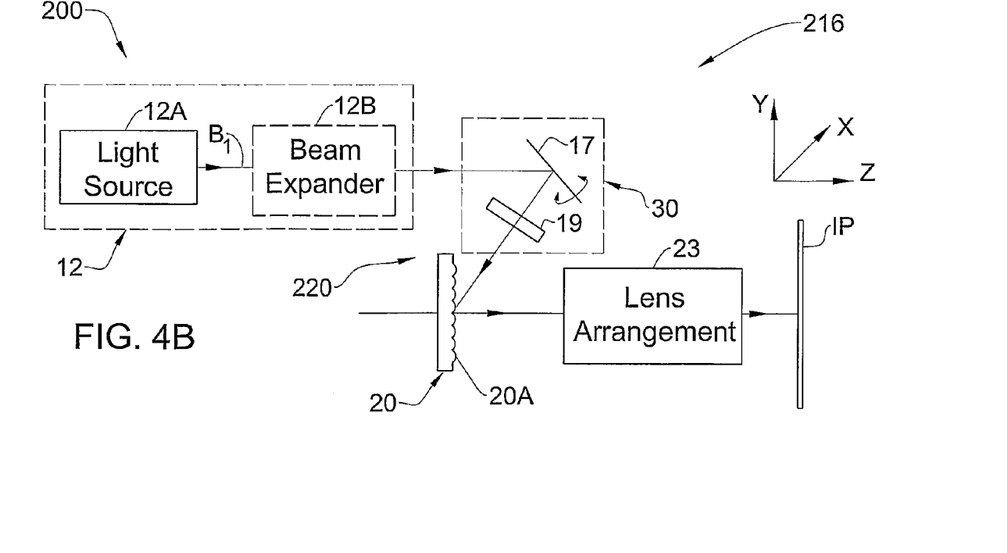
FIG. 4B shows another example of an optical system (e.g., microscope) of the present invention, utilizing the principle of temporal focusing.

According to another embodiment of the invention, it provides for the temporal focusing of an input pulse combined with spatial focusing of the pulse along one spatial axis (Y-axis). This is schematically exemplified in FIG. 4B, showing an optical processing apparatus 200 including a light source assembly 12 formed by a light source 12A (e.g., laser) and optionally also by a beam expander 12B; and an optical system 216 configured according to the invention. Here, the optical system 216 includes a pulse manipulator unit 220 formed by a temporal pulse manipulator (scatterer) 20 located in the front focal plane of a lens arrangement 23, and also a spatial pulse manipulator 30. The latter includes a mirror 17 and a lens arrangement 19. The mirror 17 is orientable so as to direct an input light pulse $B_1$ onto the surface 20A at a certain non-zero angle of incidence (as described above). In the present example, the mirror 17 is rotatable so as to provide the light pulse $B_1$ displacement (scanning) along the surface 20A. The lens arrangement 19, which is configured as an anamorphic lens arrangement (e.g., cylindrical lens), is accommodated in the optical path of light reflected from mirror 17, and is oriented so as to illuminate a line perpendicular to the grating grooves. The spatial pulse manipulator 30 is thus operable to produce a line image along the X-axis. This results in a line illumination in a sample, but with higher depth resolution, similar to that achievable by fast scanning methods.

Figure 5:
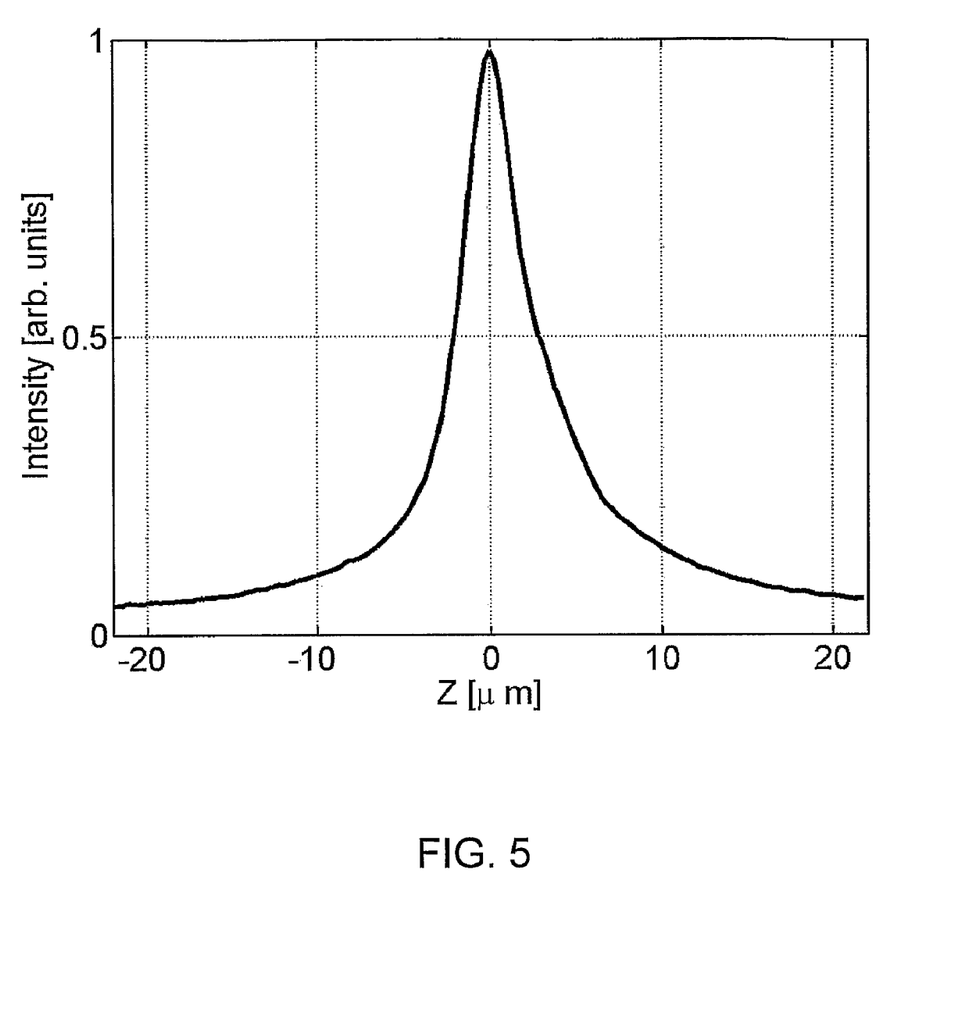
FIG. 5 illustrates experimental results obtained with the microscope of FIG. 4A.

FIG. 5 illustrates the experimental results obtained with the depth resolution of the scanningless TPEF microscope 100 of FIG. 4A. In this experiment, a sample was a 0.9 μm layer of a two-photon fluorescent dye (Coumarin 515) in a polymer matrix spin-coated on a glass slide. The total fluorescence signal from the 0.9 cm thick spin-coated fluorescent layer was measured as a function of the layer position along the Z-axis relative to the objective focal plane. Fluorescence from an area of about $10^4$ μm$^2$ was collected and measured with the photomultiplier tube. An image of the illuminated area detected by the CCD was then used to normalize for measured signal intensity due to the Gaussian shape of the excitation pulse. The measured FWHM is about 4.5 μm, a result comparable to that obtained for line scanning TPEF microscopy [Brakenhoff, G. J., Squier, J., Norris, T., Bliton, A. C., Wade, M. H., Athey, B., Real-time two-photon confocal microscopy using a femtosecond, amplified, Ti:Sapphire system, *J. Microscopy* 181, 253-259 (1995)]. The asymmetry in the depth response is due to the small shift of the position of the grating 20 from the focal point of the first telescope lens 23B, as described above. Due to the large bandwidth of the excitation pulse, chromatic aberrations induce some smearing of the focal depth curve (of the order of 1 μm).

Figure 6A:
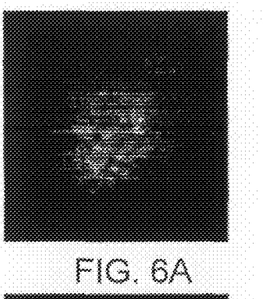
FIGS. 6A-6H exemplify scanningless depth-resolved images of a Drosophila egg-chamber stained with DAPI, a fluorescent groove-binding probe for DNA, whose absorption band is centered at 400 nm.
Figure 6B:
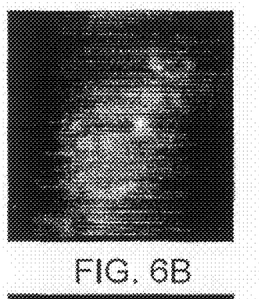
Figure 6C:
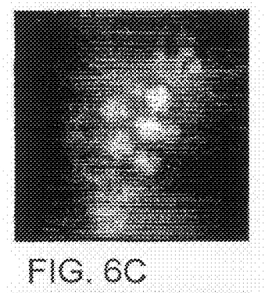
Figure 6D:
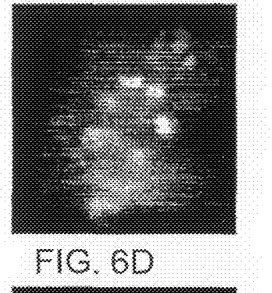
Figure 6E:
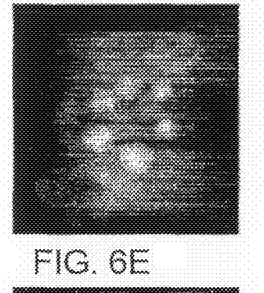
Figure 6F:
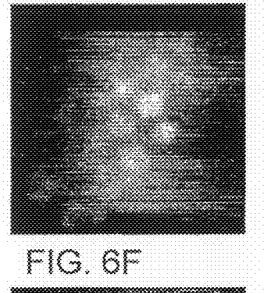
Figure 6G:
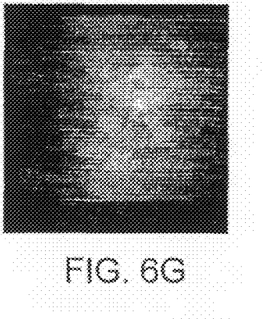
Figure 6H:
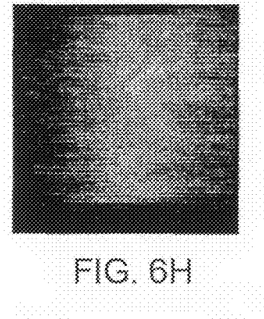

FIGS. 6A-6I show scanningless depth-resolved images of a Drosophila egg-chamber stained with DAPI, a fluorescent groove-binding probe for DNA, whose absorption band is centered at 400 nm. The images (optical cross-sections) go from the bottom of the egg chamber (FIG. 6A) to its top (FIG. 6H). The area of each image is about 140×140 μm. Images are separated by 5 μm, obtained by integrating the intensified CCD images for 30 seconds (integration time for each image). The intensifier noise was subtracted from each image, and it was corrected for spatial variations in the beam intensity assuming a Gaussian beam profile.

Figure 6I:
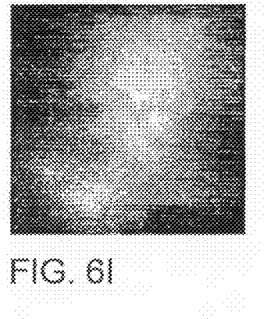
FIG. 6I exemplifies a non-depth resolved TPEF image, to be compared with that of FIG. 6F.

Each egg chamber is comprised of 15 relatively large nurse cells and a single oocyte, surrounded by a coating layer of small follicle cells. The lateral resolution of the images, determined by the numerical aperture of the objective, is of the order of 0.25 μm. The total area covered is about $10^4$ μm$^2$, corresponding to about 100,000 effective pixels. On both the bottom and top sections, follicle cells are observed, whose nuclei are approximately 3 μm in diameter. The center images (FIGS. 6B, E, H) show the nuclei of nurse cells, whose size is of the order of 10 μm, as well as the enveloping follicle cells. A smaller egg-chamber is observed in FIG. 6C. The image of FIG. 6I is one taken with the grating replaced by a simple mirror; hence the pulse remains short everywhere. This results in a non-depth resolved image, to be compared with the image of FIG. 6F. The entire egg-chamber shows a strong out-of-focus background. The relatively long integration time per frame can be overcome by using more intense pulses. Indeed, using 1 μJ pulses at a repetition rate of 1 KHz from a multipass amplifier system, allowed obtaining images of a similar quality at an integration time well below one second. It should be noted that a 100 μJ pulse, possibly broken into a burst of sub-pulses lasting several picoseconds, may be used to implement single-shot depth resolved imaging, where the illumination takes less than one nanosecond.

In order to measure a maximal signal, the peak intensity at the focal plane should be as high as possible, yet remain below the damage threshold of biological specimen [Brakenhoff, G. J., Squier, J., Norris, T., Bliton, A. C., Wade, M. H., Athey, B., Real-time two-photon confocal microscopy using a femtosecond, amplified, Ti:Sapphire system, *J. Microscopy* 181, 253-259 (1995)]. Lower repetition rate systems, such as extended cavity lasers (operating at a few MHz) [Cho, S. H., Bouma, B. E., Ippen, E. P., Fujimoto, J. G., Low-repetition-rate high-peak-power Kerr-lens mode-locked Ti:Al2O3 laser with a multiple-pass cavity, *Opt. Lett.* 24, 417-419 (1999)], or high repetition rate amplifiers (typically operating at a few hundred KHz) [Norris, T. B., Femtosecond pulse amplification at 250 KHz with a Ti:Sapphire regenerative amplifier and application to continuum generation, *Opt. Lett.* 17, 1009-1011 (1992)] are well suited to work in this regime. Extrapolating from the experiments described above, using an extended cavity 30 fs oscillator, delivering of about 50 nJ pulses at 10 MHz (a commercially available system), video-rate scanningless full frame TPEF microscopy can be easily achieved.

Depth-resolved microscopy has been, for decades, practically synonymous with laser-scanning microscopy. The technique of the present invention provides for full-frame depth-resolved microscopy (or material processing), using an extremely simple setup and standard components. The present invention may advantageously be used in various applications. For example, a scanningless setup can enable full-frame video-rate fluorescence lifetime imaging, simply by gating the CCD intensifier. Single-shot depth resolved microscopy of the present invention would be able to capture extremely rapid dynamics, up to the nanosecond regime. The scanningless setup also enables to utilize linear optical techniques, such as structured illumination, e.g. structure illumination microscopy [Gustaffson, M. G. L., Surpassing the lateral resolution limit by a factor of two using structured illumination microscopy, *J. Microscopy* 198, 82-87 (2000)], leading to enhanced spatial resolution, in multiphoton imaging applications. It should also be noted that the technique of the present invention is not limited to TPEF microscopy but can be used with practically any multiphoton process, such as second-harmonic generation [Peleg, G., Lewis, A., Bouevitch, O., Loew, L., Parnas, D., Linial, M., Gigantic optical non-linearity's from nanoparticle-enhanced molecular probes with potential for selectively imaging the structure and physiology of nanometric regions in cellular systems, *Bioimaging* 4, 215 (1996)], third-harmonic generation [Barad, Y., Eisenberg, H, Horowitz, M., Silberberg, Y., Nonlinear scanning laser microscopy by third harmonic generation, *Appl. Phys. Lett.* 70, 922-924 (1997); Muller, M., Squier, J., Wilson, K. R., Brakenhoff, G. J., 3D microscopy of transparent objects using third harmonic generation, *J. Microscopy* 191, 266-274 (1998)] or coherent anti-Stokes Raman scattering [Duncan, M. D., Reintjes, J, Manuccia, T. J., Scanning coherent anti-Stokes Raman microscope, *Opt. Lett.* 7, 350-352 (1982); Zumbusch, A., Holtom, G. R., Xie, X. S., Three-dimensional vibrational imaging by coherent anti-Stokes Raman scattering, *Phys. Rev. Lett.* 82, 4142-4145 (1999)].

Moreover, as indicated above, the present invention is not limited to imaging systems, but can also be used for material processing, e.g. simultaneous depth-resolved modification of a transparent substrate by femtosecond radiation. For example, the material processing may be aimed at creating a pattern in a medium, e.g. forming a waveguide or a multiple-waveguide configuration. Generally speaking, the material processing is based on inducing a change in the refraction index of a medium, e.g. local changes in selective locations of the medium. To this end, a similar optical setup as described above is used, just operable with higher illumination intensities as those used for example for recording in an information carrier (e.g. described in "Three-dimensional optical storage inside transparent materials", E. N. Glezer et al., Opt. Lett., 21, 2023-2025 (1996)).

Those skilled in the art will readily appreciate that various modifications and changes may be applied to the embodiments of the invention as hereinbefore described without departing from its scope defined in and by the appended claims.

The invention claimed is:

1. An optical system for use in a multi-photon microscope, the optical system comprising:
   an imaging lens arrangement, and
   a pulse manipulator arrangement,
   the pulse manipulator arrangement comprising a temporal pulse manipulator unit which is accommodated in an optical path of an input pulse of an initial profile, and is configured to affect trajectories of light components of the input pulse impinging thereon so as to direct the light components towards an optical axis of the lens arrangement along different optical paths,
   said temporal pulse manipulator unit being accommodated in a front focal plane of the imaging lens arrangement, thereby enabling to restore the input pulse profile at an imaging plane.

2. The system of claim 1, wherein the temporal pulse manipulator unit is configured to define a scattering surface extending perpendicular to the optical axis of the imaging lens arrangement, said scattering surface affecting trajectories of light components of the input pulse to thereby affect duration of the single input pulse at a point downstream of said surface.

3. The system of claim 1, wherein the temporal pulse manipulator unit is configured to define a patterned surface extending perpendicular to the optical axis of the imaging lens arrangement.

4. The system of claim 3, wherein the patterned surface is a light scattering surface.

5. The system of claim 3, wherein the patterned surface is a surface of a plate-like structure.

6. The system of claim 5, wherein said plate-like structure is substantially transparent for a spectral range of said input pulse, the optical system being configured to expose an opposite surface of said plate to the input pulse.

7. The system of claim 3, wherein said patterned surface is reflective, the optical system being configured to directly expose said patterned surface to the input pulse.

8. The system of claim 3, wherein said patterned surface is configured to provide a substantially directional scattering of light incident thereon, to direct the scattered light components of the input pulse substantially towards the optical axis of the imaging lens arrangement.

9. The system of claim 3, wherein said patterned surface is a surface of a diffraction grating structure.

10. The system of claim 9, wherein the diffraction grating is configured to define a single diffraction order.

11. The system of claim 1, configured to provide normal incidence of the input pulse onto said temporal pulse manipulator unit.

12. The system of claim 1, configured to provide incidence of the input pulse onto said temporal pulse manipulator unit with a certain non-zero angle of incidence.

13. The system of claim 1, wherein the pulse manipulator arrangement comprises a spatial pulse manipulator unit.

14. The system of claim 13, wherein the spatial pulse manipulator unit is accommodated in an optical path of the input pulse propagating towards the temporal pulse manipulator and is configured for focusing the input pulse in the form of a line extending along a first axis parallel to the temporal pulse manipulator.

15. The system of claim 12, wherein the pulse manipulator arrangement comprises a spatial pulse manipulator unit.

16. The system of claim 15, wherein the spatial pulse manipulator unit is accommodated in an optical path of the input pulse propagating towards a scattering surface of the temporal pulse manipulator unit that extends along a first axis perpendicular to the optical surface.

17. The system of claim 16, wherein the spatial pulse manipulator unit is configured to displace the input pulse along said patterned surface while spatially shaping the input pulse to produce a line image.

18. The system of claim 17, wherein the spatial pulse manipulator unit has one of the following configurations: comprises a scanner and an anamorphic optics; and comprises a rotatable mirror and a cylindrical lens.

19. The system of claim 16, wherein the temporal pulse manipulator unit is configured for temporal focusing of the input pulse, and the spatial pulse manipulator unit is configured for spatial focusing of said input pulse along one spatial axis.

20. The system of claim 1, wherein the imaging lens arrangement is configured as a high magnification telescope system.

21. The system of claim 20, wherein the imaging lens arrangement comprises an achromatic lens, and an objective lens located downstream of the achromatic lens with respect to a direction of the input pulse propagation through the system.

22. The system of claim 1, configured for producing, in an imaging plane, an illuminating pulse of said initial profile illuminating a region which is many orders of magnitude larger than a diffraction-limited spot of the imaging lens arrangement.

23. A multi-photon microscope comprising
a light source assembly operable to generate a short pulse of a predetermined initial profile;
a light detection assembly; and
the optical system of claim 1.

24. A multi-photon microscope comprising
a light source assembly operable to generate a short pulse of a predetermined initial profile; a light detection assembly; and
the optical system of claim 1,
wherein the temporal pulse manipulator is configured to affect trajectories of light components of the input pulse to increase the pulse duration at a point downstream of the temporal pulse manipulator, thereby producing, in an imaging plane, an illuminating pulse that has a restored profile of the initial pulse and has a cross-sectional area significantly larger than a diffraction-limited spot of the imaging lens arrangement.

25. A multi-photon microscope comprising
a light source assembly operable to generate a short pulse of a predetermined initial profile;
a light detection assembly; and
the optical system of claim 1,
wherein the temporal pulse manipulator unit is aligned perpendicular to the optical axis of the imaging lens arrangement in the front focal plane thereof and is oriented with respect to the initial input pulse such that said initial impulse pulse is incident onto said temporal pulse manipulator unit with a certain non-zero angle of incidence, the temporal pulse manipulator unit being configured to affect trajectories of light components of the input pulse to thereby affect a duration of the pulse at a point downstream of said temporal pulse manipulator, thereby producing, in an imaging plane, an illuminating pulse that has a restored profile of the initial pulse and moves along the imaging plane thereby illuminating an area significantly larger than a diffraction-limited spot of the imaging lens arrangement.

26. The microscope of claim 25, wherein said pulse manipulator arrangement comprises the temporal pulse manipulator which is accommodated in the front focal plane of the lens arrangement and extending along a first axis perpendicular to the optical axis of the lens arrangement and which is operable to provide temporal focusing of an input pulse; and a spatial pulse manipulator which is accommodated in an optical path of the input pulse propagating towards the temporal pulse manipulator and is configured for focusing the input pulse in the form of a line extending along said first axis.

27. A multi-photon material processing system for inducing a change in optical properties of a material, the system comprising a light source assembly operable to generate a short pulse of a predetermined initial profile and predetermined intensity; and the optical system of claim 1.

28. The system of claim 27, wherein said pulse manipulator arrangement comprises the temporal pulse manipulator which is accommodated in the front focal plane of the lens arrangement and extending along a first axis perpendicular to the optical axis of the lens arrangement and which is operable to provide temporal focusing of an input pulse; and a spatial pulse manipulator which is accommodated in an optical path of an input pulse propagating towards the temporal pulse manipulator and is configured for focusing the input pulse in the form of a line extending along said first axis.

* * * * *